United States Patent [19]

Fukuda et al.

[11] 4,279,000
[45] Jul. 14, 1981

[54] PHOTOELECTRIC INFORMATION INPUT APPARATUS

[75] Inventors: Tadaji Fukuda, Kawasaki; Susumu Sugiura, Yamato, both of Japan

[73] Assignee: Canon Kabushiki Kaisha, Tokyo, Japan

[21] Appl. No.: 60,824

[22] Filed: Jul. 25, 1979

[30] Foreign Application Priority Data

Jul. 26, 1978 [JP] Japan .................................. 53-91049

[51] Int. Cl.$^3$ .............................................. H04N 3/14
[52] U.S. Cl. ..................................... 358/213; 358/209
[58] Field of Search ................ 358/201, 209, 213, 230

[56] References Cited

U.S. PATENT DOCUMENTS

| | | | |
|---|---|---|---|
| 3,243,508 | 3/1966 | Sclar | 358/230 |
| 4,100,573 | 7/1978 | Berger | 358/209 |

*Primary Examiner*—Robert L. Griffin
*Assistant Examiner*—Michael A. Masinick

*Attorney, Agent, or Firm*—Fitzpatrick, Cella, Harper & Scinto

[57] ABSTRACT

A photoelectric information input apparatus has a photoelectric converting unit including a photoelectric converting layer provided between a linear array of picture element electrodes in a number n and a counter electrode provided in facing relationship to said array and composed of a charge generating portion provided at the side of an electrode transparent to the incident light and of a charge transporting portion for effectively transporting the charge generated in said charge generating portion, said photoelectric converting layer having thickness monotonously changing from an end to the other of said counter electrode. An insulating layer is provided between said photoelectric converting layer and said counter electrode or/and picture element electrodes. There are generated control signals for controlling said photoelectric converting unit so as to obtain electric signals corresponding to the optical signals received by said photoelectric converting portion.

4 Claims, 16 Drawing Figures

PHOTOELECTRIC INFORMATION INPUT APPARATUS

BACKGROUND OF THE INVENTION

1. Field of the Invention

The present invention relates to an information input apparatus, and more particularly to an information input apparatus provided with a photoelectric transducer.

2. Description of the Prior Art

Information input apparatus with solid-state photoelectric transducer are applicable for television cameras, an input unit for facsimile, digital copiers etc., or reading apparatus for characters or other images, and have been the subject of active development in recent years.

Such information input apparatus generally comprises a group of picture elements each having a photoelectric transducing function and a circuit having a scanning function for obtaining the electric signals from said picture elements in time-sequentially arranged form, and many utilize a combination of photodiodes and MOS-FET or metaloxide semi-conductor field-effect transistors (such combination being hereinafter referred to as MOS-type imaging device) or a CTD (charge transfer device) such as a CCD (charge coupled device) or a BBD (bucket brigade device).

However, in such MOS-type imaging device or CTD which has to be formed on a single crystal silicon wafer, the light-receiving area of the photoelectric transducer is limited by the dimension of the available single crystal silicon wafer. Thus, in the present status of the art which only allows manufacture of a satisfactorily uniform single crystal silicon wafer of several inches in diameter at maximum, the dimension of the light-receiving area of such MOS-type imaging device or CTD formed on such wafer can never exceed the above-mentioned dimension of the single crystal silicon wafer.

Consequently, in case there is employed an information input apparatus utilizing a photoelectric transducer of such limited light-receiving area for the optical information input for example into a digital copier, it becomes indispensable to place an optical system of an elevated reduction rate between an original to be copied and the light-receiving face, thereby focusing the image of said original within the light-receiving area.

Such arrangement requires a certain amount of light path length which is decisively unfavorable for the compactization of the entire apparatus.

As an alternative, there is also proposed an arrangement in which plural photoelectric transducers are aligned in such a manner that the longitudinal length of entire light-receiving areas is equal or approximately equal to the length in the principal scanning direction of the maximum length copiable and the image of the original is divided into the partial sections of a number corresponding to that of the photoelectric transducers, whereby the optical path length is reduced for the compactization of the apparatus.

However such arrangement is still defective since the alignment of plural photoelectric transducers inevitably forms light-insensitive boundary areas therebetween, thus resulting in an discontinuous light-receiving area, whereby the optical image of the original is divided into small portions and the image corresponding to said boundary portions is not entered into the photoelectric transducers, so that the resulting copy either has unimaged white stripes or is composed of incomplete combination of image fragments not containing such white stripe portions. Also as the optical image on each photoelectric transducer is optically inverted, the entire image formed on said photoelectric transducers is different from the optically inverted image of the original. For this reason the reproduction of the original image cannot be achieved by simply reproducing said entire image.

In addition to the foregoing, the number of lead electrodes connecting the photoelectric transducer with other electric circuits is in the conventional technology at least equal to the sum of the number of picture element electrodes and that of counter electrodes and increases with the increase in number of the picture elements. Consequently the conventional technology cannot be free from the limitation of complexity in the electric bonding and other manufacturing procedure and also from the requirement for the high-precision manufacturing technology, which increase the mass production and cost reduction.

As explained in the foregoing, the information input apparatus utilizing conventional photoelectric transducer is associated with various drawbacks yet to be solved, including the aforementioned requirement for the optical system of an elevated image reduction rate resulting from the limited dimension of the light-receiving face and giving rise to a significantly large optical path length, thus rendering the compactization extremely difficult.

For this reason there has been required an information input apparatus provided with a photoelectric transducing unit having a light-receiving face of an expanded length and of an improved resolution. Particularly for the applications in facsimile or digital copier or in the character or image reading apparatus, indispensable is an information input apparatus provided with a photoelectric transducing unit having a light-receiving face of a dimension equal or approximately equal to the size of the original to be reproduced and of a resolving power sufficient for faithful reproduction of the original image.

SUMMARY OF THE INVENTION

The object of the present invention, therefore, is to provide an extremely light-weight information input apparatus provided with a photoelectric transducing unit having an extended light-receiving face and also having a high resolving power and a high sensitivity.

Another object of the present invention is to provide a photoelectric information input apparatus comprising: a photoelectric converting unit having a photoelectric converting layer provided between a linear array of picture element electrodes in a number n and a counter electrode provided in facing relationship to said array and composed of a charge generating portion provided at the side of an electrode transparent to the incident light and of a charge transporting portion for effectively transporting the charge generated in said charge generating portion, said photoelectric converting layer having thickness monotonously changing from an end to the other of said counter electrode; and insulating layer(s) provided between said photoelectric converting layer and said counter electrode or/and picture element electrodes; and means for generating control signals for controlling said photoelectric converting unit so as to obtain electric signals corresponding to the optical signals received by said photoelectric converting portion.

BRIEF DESCRIPTION OF THE DRAWINGS

FIG. 3 are explanatory charts showing the function of the photoelectric transducing unit shown in FIG. 1, wherein

FIGS. 7A, 7B, 7C, 7D and 7E are timing charts of the signals in the circuits shown in FIG. 6, wherein FIGS. 7A, 7D and 7E are those for input signals while FIGS. 7B and 7C are those for output signals.

DESCRIPTION OF PREFERRED EMBODIMENTS

Figure 1:
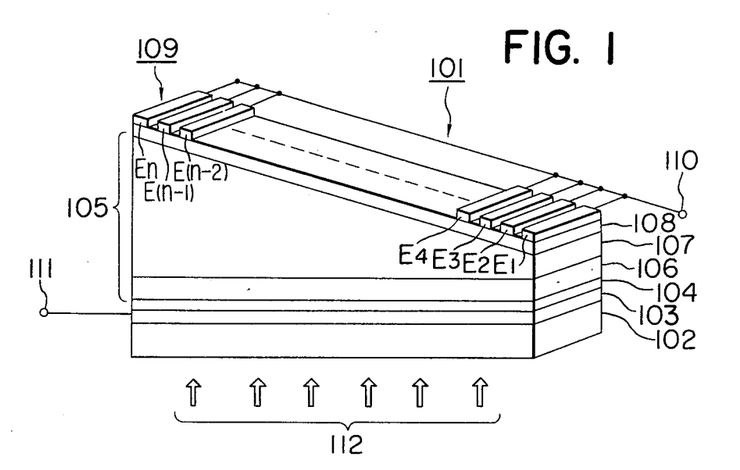
FIG. 1 is a schematic perspective view of the photoelectric transducing unit of the information input apparatus embodying the present invention.

In FIG. 1, the photoelectric transducing unit 101, is shown to comprise a substrate 102 of desired length and width, and a successive laminar structure thereon of an elongated counter electrode 103, an insulating layer 104, a photoelectric converting layer 105, an insulating layer 108 and picture element electrodes 109 (E1, E2, . . . , En) discretely arranged as a planar array on said insulating layer 108.

Said photoelectric converting layer 105 comprises, at the side of said insulating layer 104, a charge generating portion 106 for generating a charge upon absorption of actinic light, and, at the side of said insulating layer 108, a charge transporting portion 107 for effectively transporting the charge generated in said charge generating portion 106 toward the picture element electrodes 109.

In the photoelectric transducing unit 101 shown in FIG. 1, the information-carrying light 112 is guided through the substrate 102 since the charge generating portion 106 is provided at the side of said substrate 102. Consequently said substrate 102, electrode 103 and insulating layer 104 are composed of materials transparent to the actinic light so that it is sufficiently absorbed by the charge generating portion 106.

For example for an actinic light in the visible-wavelength region, the substrate 102 can be composed of glass, transparent ceramics such as magnesia, belliria, spinell or yttrium oxide, single crystal plates, transparent plastics such as acrylic resin, while the electrode 103 can be composed of ITO ($In_2O_3:SnO_2=85-98:15:2$), $SnO_2$, $In_2O_3$, Au,NiCr or Al.

Also the examples of the material for the insulating layer 104 are poly-p-xylene, polyurethane, polycarbonate, polyethylene, $SiO_2$, $Si_3N_4$ and SiNO.

The photoelectric converting layer 105 is of a structure having a thickness monotonously changing from one end to the other of the electrode 103 in such a manner that the electric fields between the picture element electrodes 103 and the counter electrode 103 are graduated even though the potential between said electrodes are uniform, and said charge generating portion 106 and the charge transporting portion 107 are composed of materials so selected as to form a sharp potential barrier therebetween.

The formation of such potential barrier in the photoelectric converting layer 105 gives rise to the presence of a threshold voltage Vth in the characteristic of photocurrent Ip as a function of the applied voltage.

The presence of such threshold voltage Vth is effective for eliminating the eventual noise current between the electrode 103 and each picture element electrode.

Figure 2A:
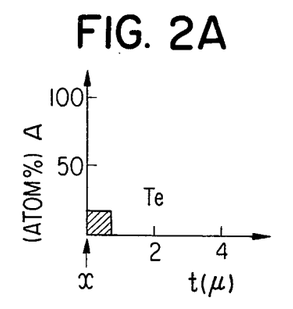
FIGS. 2A, 2B and 2C are charts showing an example of the composition of the photoelectric converting layer of the photoelectric transducing unit shown in FIG. 1.
Figure 2B:
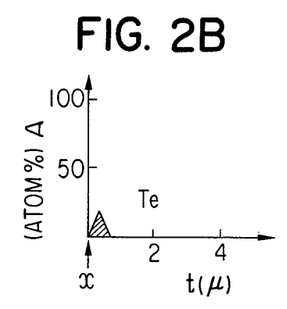

The photoelectric converting layer 105 having a sharp potential barrier between the charge generating portion 106 and the charge transporting portion 107 can be obtained, for example as shown in FIGS. 2A and 2B, by forming the charge generating portion 106 with an extremely thin layer of SeTe containing tellurium in 5–50 atom% and forming the charge transporting portion 107 with selenium. In this case the charge generating portion 106 need not necessarily be positioned at the light entrance side of the photoelectric converting layer 105 but may be provided, as shown in FIG. 2C, inside the photoelectric converting layer 105 at a position that the actinic light can satisfactorily reach said SeTe layer.

The thermal stability of the photoelectric converting layer 105 can be improved for example by adding arsenic in an amount of 0.2–10 atom.% at the formation of the charge generating portion 106 and charge transporting portion 107, or by providing thin layers of 250–1000 Å of selenium-arsenic alloy containing arsenic in an amount of 0.2–5 atom.% at the interfaces between the photoelectric converting layer 105 and the insulating layers 104, 108.

Figure 2C:
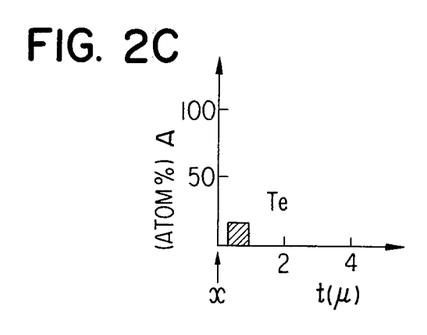

FIGS. 2A, 2B and 2C show the thickness t of the photoelectric converting layer 105 in abscissa as the function of the selenium content A in atom.% in ordinate, wherein the light entrance side being indicated by the arrow.

The insulating layer 108 need not necessarily be transparent to the actinic light, and can be composed of any material already explained in connection with the insulating layer 104.

The electrodes 109 are divided into the number of required picture elements (n in the illustration) and can be composed of evaporated aluminum or gold.

The divided structure of the electrodes 109 can be prepared either by means of a metal mask having a desired pattern of the divided electrodes, or by means of uniform evaporation followed by pattern formation by photoetching technology. In case the insulating layer 108 is undesirably affected by the chemicals employed in the photoetching technology, it becomes necessary to form the electrode 103 as the picture element electrodes while to form the electrodes 109 as a continuous counter electrode.

Also the electrode 109 has to be transparent in case the substrate 102 is composed of an opaque material such as aluminum.

Now the function of the photoelectric transducing unit 101 shown in FIG. 1 will be explained in the following explanation to be taken in conjunction with FIGS. 3A, 3B, 3C and 3D.

Figure 3A:
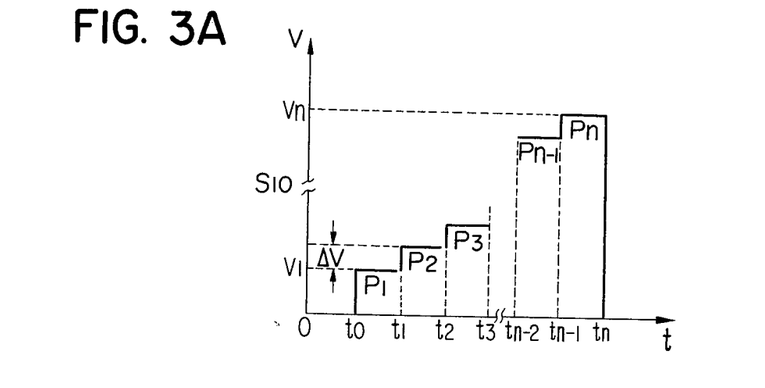
FIGS. 3A and 3D are timing charts of input signal.

FIG. 3A shows a step-shaped control signal S10 to be supplied from an input terminal 110 of the photoelectric transducing unit 101, said signal S10 being composed of a group of n voltage pulses respectively corresponding to the threshold voltages between the electrode 103 and picture element electrodes 109. More specifically the first-step voltage is equal to the threshold voltage V1 between the electrode 103 and a picture element electrode E1, the second-step voltage is equal to the threshold voltage V2 between the electrode 103 and a picture element electrode E2, and the n-th step voltage is equal to that between the electrode 103 and a picture element electrode En, wherein $V1<V2<\ldots<Vn$. The step voltages $V1, V2, \ldots, Vn$ can be selected as represented by $V1=V1, V2=V1+\Delta V1, \ldots, Vn=V1+\Delta Vn-1$ by continuously and monotonously increasing the thickness of the photoelectric converting layer 105. Thus a control signal S10 showing a regular increase of voltage within a time $\Delta t$ $(=t_k - t_{k-1})$ can also be utilized as an input signal for driving the photoelectric transducing unit 101.

Figure 3B:
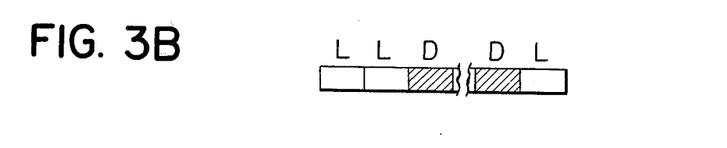
FIG. 3C is a timing chart of output signals and FIG. 3B is a chart showing the original image pattern.
Figure 3C:
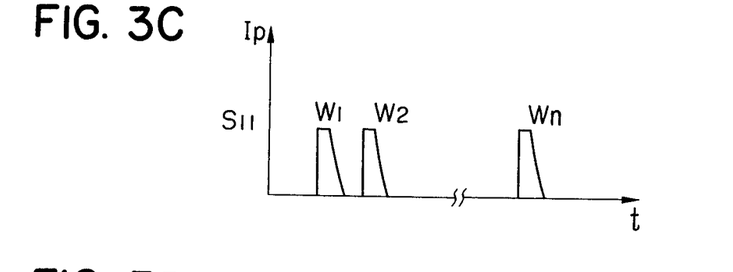

When a control signal S10 as shown in FIG. 3A is supplied to the input terminal 110 of the photoelectric transducing unit 101 exposed to the light coming through an original pattern as shown in FIG. 3B, wherein L and D respectively represent a non-image or lighted area and an image or dark area, there are obtained, from the output terminal 111, time-sequential pulse signals $W1, W2, \ldots, Wn$ as shown in FIG. 3C corresponding to the number of said lighted areas L.

More detailedly, in response to a voltage signal P1 of a voltage V1 supplied to the input terminal 110 during a period t1-t0, there is generated a photocurrent Ip between the electrode 103 and the picture element electrode E1 as the area of said electrode E1 is exposed to the light and as said voltage V1 is equal to the threshold voltage between said electrodes. Said photocurrent Ip, however, is given not as a stationary current but as a transient current since the photoelectric converting layer 105 is electrically blocked on both ends thereof by the insulating layers 104 and 108.

In this manner, the picture element electrode E1 generates, in response to the application of the threshold voltage V1 and the irradiation of the light, a photocurrent Ip which in turn causes the electric charging of said insulating layers 104 and 108 and which is interrupted upon saturation of said charging. The photocurrent is not generated at other picture element electrodes since the threshold values are not reached at this stage. Consequently the output terminal 111 releases the output signal W1 shown in FIG. 3C during the period from t0 to t1 representing the information at the picture element electrode E1.

Upon successive entry of a voltage signal P2 of a voltage V2 at the input terminal 110 during a period from t1 to t2, there is generated a photocurrent Ip at the picture element electrode E2 of which threshold voltage is equal to V2, but no photocurrent is generated in the areas other than the picture element electrodes E1 and E2 as the threshold value is not reached at other picture element electrodes.

Although the picture element electrode E1 is subjected to the voltage V2 in excess of the threshold value thereof and also to the irradiation of light, the photocurrent in response to the voltage signal P2 is negligibly small since the charging of the insulating layers 104 and 108 is completed by the photocurrent generated in response to the voltage signal P1.

Consequently during the period from t1 to t2, the output terminal 111 releases an output signal W2 as shown in FIG. 3C as the information signal at the picture element electrode E2. Thus in response to the control signal S10 supplied to the input terminal 110, each picture element electrode corresponding to the lighted areas provides a photocurrent Ip when the voltage signal Pk corresponding to the threshold voltage of said picture element electrode is first applied thereto, and in this manner the output signals W are time-sequentially released from the output terminal 111. Thus, by exposing the photoelectric transducing unit 101 to the light coming through an original having a pattern as shown in FIG. 3B and by supplying the control signal S10 as shown in FIG. 3A to the input terminal 110, there are obtained signals S11 corresponding to said pattern from the output terminal 111.

The duration $\Delta t$ of the voltage signal P is selected longer than the time required for the termination of photocurrent Ip between the electrode 103 and each picture element electrode E (charge completion time) in order to avoid the generation of noise signal in the dark areas.

Figure 3D:
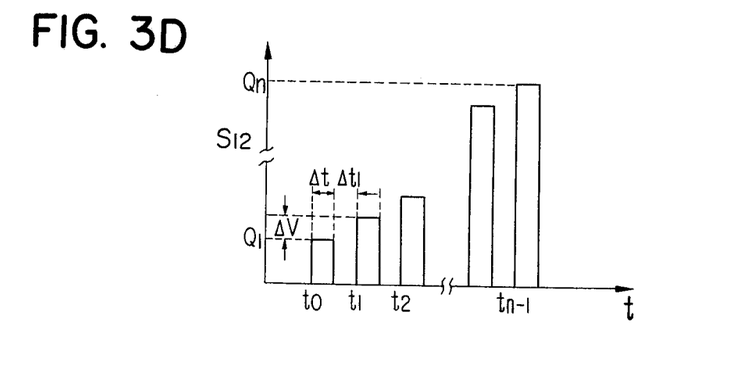

The signal to be supplied to the photoelectric transducing unit 101 is not necessarily limited to the stepwise control signal S10 as shown in FIG. 3A but may assume the form of control signal S12 shown in FIG. 3D composed of discrete voltage pulse signals Q interspaced by a time $\Delta t1$.

As in the case of the control signal S10, the n voltage pulses $(Q1, Q2, \ldots, Qn)$ of the control signal S12 are so selected as to respectively correspond the threshold voltages between the electrode 103 and the picture element electrodes in the photoelectric transducing unit 101.

More detailedly, as shown in FIG. 3D, the voltage signal Q1 is selected equal to the threshold voltage V1 between the electrode 103 and the picture element electrode E1, and the voltage signal Q2 is selected equal to the threshold voltage $V1-\Delta V1$ between the electrode 103 and the picture element electrode E2.

In case of the control signal S12, the duration $\Delta t$ of each of the n voltage pulses $Q1, Q2, \ldots, Qn$ is selected in a similar manner as the duration of each step voltage in the control signal S10, and the duration $\Delta t1$ between the succeeding voltage pulses Q is selected shorter than the time required for discharging the charge between the insulating layers 104 and 108 accumulated by the photocurrent between the electrode 103 and each picture element electrode 109.

Although in the photoelectric transducing unit 101 shown in FIG. 1 the photoelectric converting layer 105 is electrically blocked on both sides by the sandwiching insulating layers 104 and 108, the insulating layer may only be provided on the light entrance side in order to prevent a stationary photocurrent in the photoelectric converting layer 105. In such case said insulating layer has naturally to be transparent to the actinic light since it is positioned closer to the light source than the charge generating portion 106.

Figure 4:
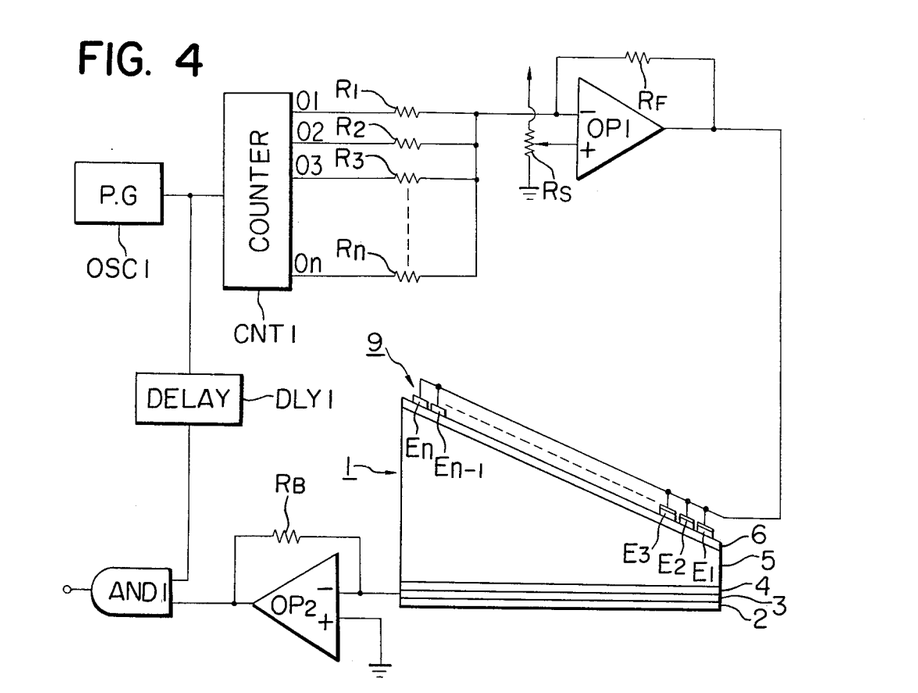
FIGS. 4 and 6 are circuit diagrams showing the embodiments of essential parts of the information input apparatus of the present invention.

FIG. 4 is a circuit diagram for driving the photoelectric transducing unit 101 of FIG. 1, wherein there are shown a pulse generator OSC1, a counter CNT1 for time-sequentially releasing signals from plural output terminals in response to the input pulse signals supplied from said pulse generator OSC1, a delay circuit DLY1 for delaying the input signals from said pulse generator OSC1 by a certain time, an operational amplifier OP1, an AND gate AND1, and resistors Ri.

When n pulse signals corresponding to the number of picture element electrodes $P1, P2, \ldots, Pn$ are released from the pulse generator OSC1 as the signal S10, the switches of corresponding number in the counter CNT1 are closed in succession to release the signals in succession and corresponding to the signal S10 from the output terminals O1–On, which are connected to the negative input terminal of the operational amplifier OP1 respectively through n resistors R1, R2, . . . , Rn having different resistances determined in consideration of the threshold voltages Vth between the electrode 103 and respective picture element electrodes E1, E2, . . . , En of the photoelectric transducing unit 101.

In response to the signals released in succession from the output terminals O1–On of the counter CNT1, the operational amplifier OP1 releases the step-shaped control signal S10 as shown in FIG. 3A or the signal S12 as shown in FIG. 3D, which is supplied to the photoelectric transducing unit 101 through the input terminal thereof.

In case said photoelectric transducing unit 101 is exposed to the light for example coming through an original of a pattern as shown in FIG. 3B, there is obtained the signal S11 composed of a group of time-sequential pulses W1, W2, . . . , Wn as shown in FIG. 3C, from said photoelectric transducing unit 101.

The thus obtained signal S11 is supplied to the negative input terminal of another operational amplifier OP2 of which output signal is in turn supplied to an input port of the AND gate AND1.

On the other hand the signals from the pulse generator OSC1 are supplied to the other input port of said gate AND1, which thus release, from the output port thereof, the time-sequential signals corresponding to the pattern of the original.

As explained in the foregoing, the photoelectric information input apparatus of the present invention is capable, in response to the light irradiation over the entire light-receiving face thereof, of releasing the photoelectrically converted signals in time-sequential manner from the output terminal 111 upon receipt of the control signal as shown in FIGS. 3A or 3D, and is therefore extremely adapted for use as an optical information input apparatus for time-sequential data output apparatus such as ink jet recorder, digital copier or facsimile.

Figure 5:
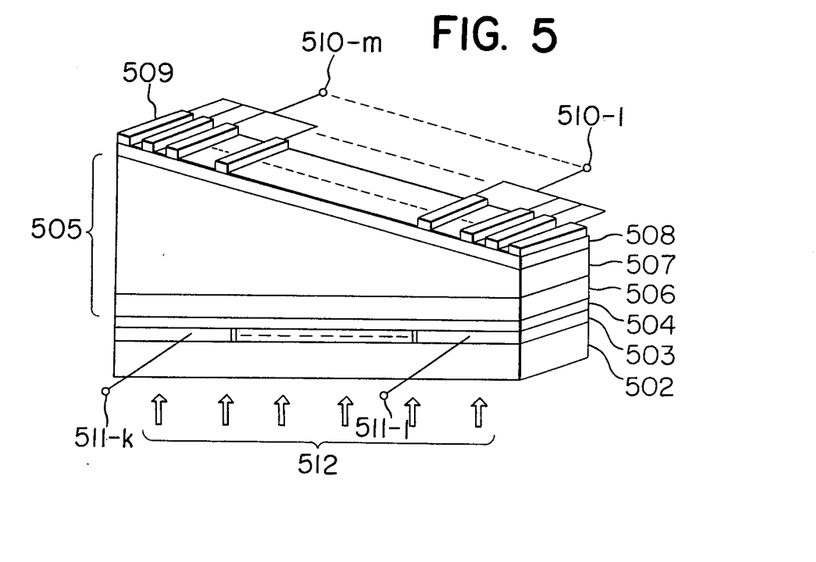
FIG. 5 is a schematic perspective view of another embodiment of the present invention.

FIG. 5 shows, in a schematic perspective view, another preferred embodiment of the photoelectric transducing unit of the present invention.

More specifically the apparatus shown in FIG. 5 provides a structure suitable for the requirement of high-speed image reproduction which may not be coped with by the apparatus shown in FIG. 1 equipped with only one output terminal.

The structure shown in FIG. 5 is same as that shown in FIG. 1 except that the counter electrode 503 is electrically divided into k portions respectively provided with output terminals 511-1, 511-2, . . . , 511-k, and that there are provided m input terminals 510-1, 510-2, . . . , 510-m each commonly connected to plural picture element electrodes facing to each of thus divided counter electrode, and the working principle is therefore basically same as that of the apparatus shown in FIG. 1.

In the apparatus shown in FIG. 5, in response to the simultaneous input of the control signals to said m input terminals 510-1, 510-2, . . . , 510-m and to the infomation-carrying optical signal 512 irradiated from the side of substrate 502, there are obtained, from k output terminals 511-1, 511-2, . . . , 511-k, the corresponding output signals which are supplied to an output apparatus such as an ink jet printer with or without time-sequential rearrangement.

Figure 6:
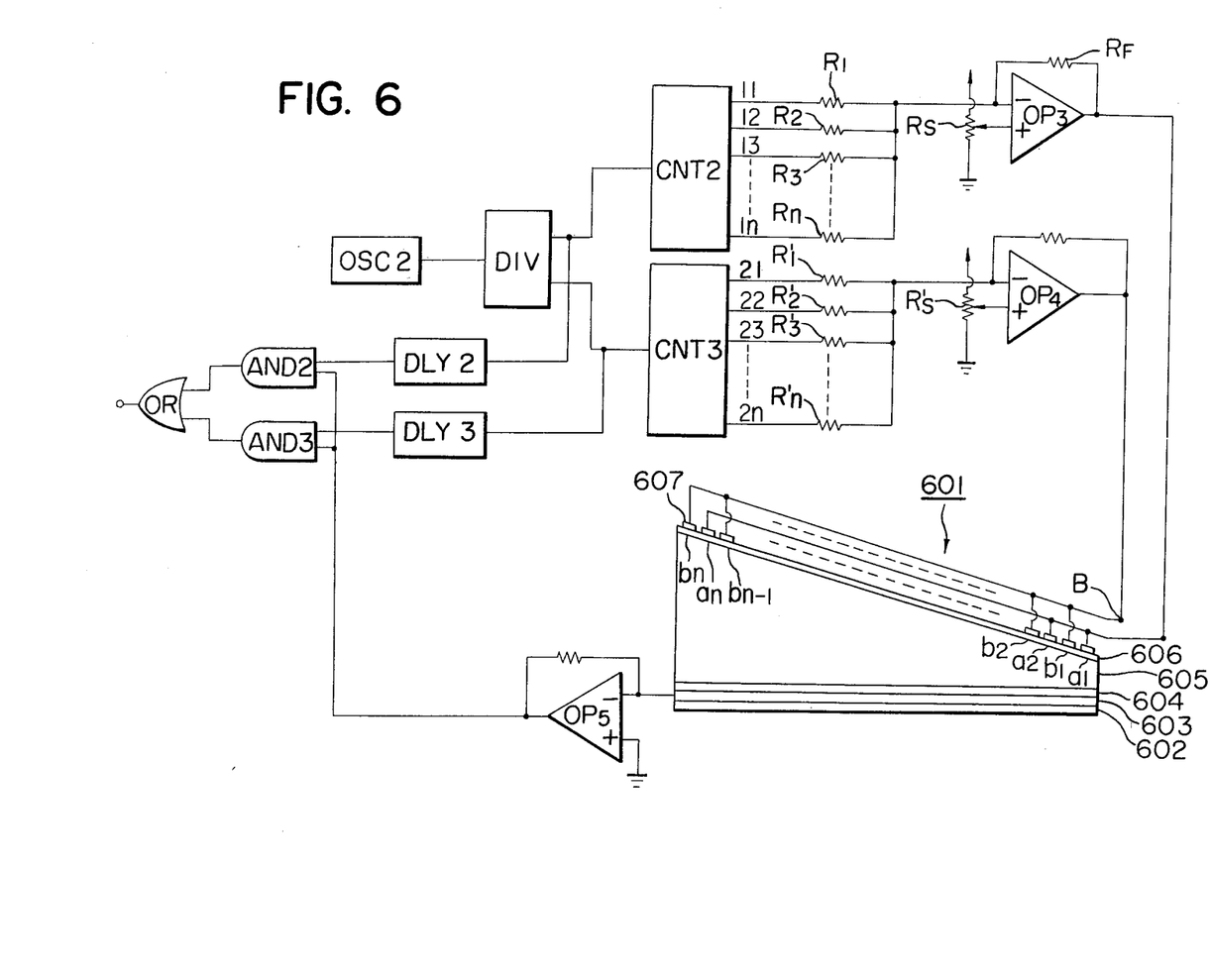

FIG. 6 is a circuit diagram of another preferred embodiment of the present invention.

In general the improvement in the resolving power can be achieved by the increase in number of the picture element electrodes per unit length, but the reduced electrode spacing resulting from such increase in number of electrodes generally results in an increased crosstalk between the electrodes, an increased possibility of electric leak between the electrodes and an increased difficulty in attaching lead wires to the electrodes. The circuit shown in FIG. 6 is particularly adapted for avoiding such drawbacks.

The photoelectric transducing unit 601 shown in FIG. 1 is essentially same as the unit 101 shown in FIG. 1 except that the unit 601 is provided with two input terminals A and B, and is therefore based on the essentially same working principle as that for the unit 101. In FIG. 6 DIV represents a pulse divider for frequency-dividing the pulse signals of a certain frequency, and other symbols have the same meanings as explained in FIG. 4.

Figure 7A:
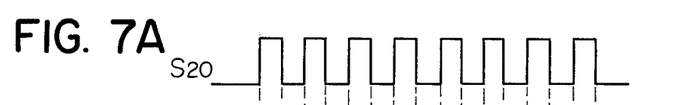
Figure 7B:
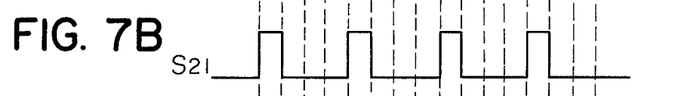
Figure 7C:
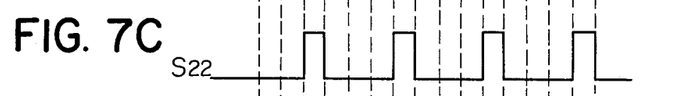

Upon receipt of a control signal S20 composed of 2n pulses corresponding to the number 2n of the picture element electrodes 607 (a1, a2, . . . , an, b1, b2, . . . , bn) as shown in FIG. 7A supplied from a pulse generator OSC2, said pulse divider DIV, by selecting every other pulses, releases signals S21 and S22 each composed of n time-sequential pulses, which are respectively supplied to the counters CNT2 and CNT3.

Upon receipt of said n pulses by the counter CNT2, the n switches provided therein are in succession closed to release corresponding time-sequential signals from the output terminals 1l–1n of said counter CNT2.

Also upon receipt of said n pulses by the counter CNT3, the n switches provided therein are in succession closed to release corresponding time-sequential signals from the output terminals 2l–2n of said counter CNT3.

Said output terminals 1l–1n of the counter CNT2 are connected to the negative input terminal of an operational amplifier OP3 respectively through resistors R1, R2, . . . , Rn having different resistances determined in consideration of the threshold voltages Vth between the electrode 603 and respective picture element electrode a1, a2, . . . , an of the photoelectric transducing unit 601.

Also said output terminals 2l–2n of the counter CNT3 are connected to the negative input terminal of another operational amplifier OP4 respectively through resistors R1', R2', . . . , Rn' having different resistances determined in consideration of the threshold voltages Vth between the electrode 603 and the respective picture element electrodes b1, b2, . . . , bn of the counter CNT3.

Figure 7D:
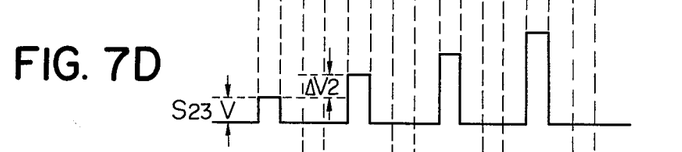

Thus, upon receipt of the time-sequential output signals from the output terminal 1l–1n of the counter CNT2, the operational amplifier OP3 supplies the signal S23 composed of pulses of different levels as shown in FIG. 7D, to an input terminal A of the photoelectric transducing unit 601.

Figure 7E:
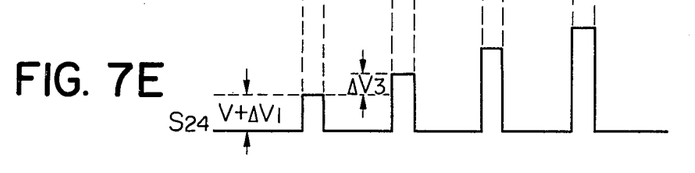

Also upon receipt of the time-sequential output signals from the output terminals 2l–2n of the counter CNT3, the operational amplifier OP4 supplies the signal S24 composed of pulses of different levels as shown in FIG. 7E, said pulses being different from those constituting said signal S23, to the input terminal B of the photoelectric transducing unit 601.

The signals S23 and S24 can be defined in the following manner. The signal S23 is composed of n voltage pulses of which voltage is successively increased by $\Delta 2$, $\Delta 4, \ldots$, from an initial voltage V, wherein said initial voltage V being equal to the threshold voltage at the picture element electrode a1, the voltage $(V+\Delta V2)$ being equal to the threshold voltage at the picture element electrode a2, and thereafter the voltage $(V+\Delta V_{n-1}$ (n: an odd number equal to or larger than 3)) being equal to the threshold voltage at the picture element electrode an.

On the other hand the signal S24 is composed of n voltage pulses of which voltage is successively increased by $\Delta 3, \Delta 5, \ldots$ from an initial voltage $V-\Delta V1$, wherein said initial voltage $V+\Delta V1$ being equal to the threshold voltage at the picture element electrode b1, the voltage $V+\Delta V2$ being equal to the threshold voltage at the picture element electrode b2, and thereafter the voltage $(V+\Delta V_{n-1}$ (n: an even number equal to or larger than 2)) being equal to the threshold voltage of the picture element electrode bn. Also the timing of the input of the signal S24 to the input terminal B is synchronized with the completion of input of the signal S23 to the input terminal A.

Thus, in response to said signals S23 and S24, the photoelectric transducing unit 601 releases, from the output terminal thereof, the signals corresponding to the pattern of the image, said output signals being supplied to the negative input terminal of an operational amplifier OP5.

In response to said signals the operational amplifier supplies output signals to an input port of an AND gate AND2.

Also the output signals from the pulse divider are respectively supplied, after suitable delay by delay circuits DLY2 and DLY3, to the other input ports of the gates AND2 and AND3.

In this manner the signals from the operational amplifier OP5 and those from said delay circuits are released synchronizedly from the gates AND2 and AND3 through an OR gate OR to an output apparatus or a memory apparatus.

What we claim is:

1. A photoelectric information input apparatus comprising:
    a photoelectric converting unit having
        a photoelectric converting layer provided between a linear array of a number n of picture element electrodes and a counter electrode and having a charge generating portion provided on an electrode transparent to the incident light and a charge transporting portion for effectively transporting the charge generated in said charge generating portion, said photoelectric converting layer having a wedge shaped configuration and the varying wedge thickness, and at least one insulating layer provided between said photoelectric converting layer and said counter electrode or between said photoelectric converting layer and said linear array of picture element electrodes; and
    means for generating control signals for controlling said photoelectric converting unit so as to obtain electric signals corresponding to the optical signals received by said photoelectric converting portion.

2. A photoelectric information input apparatus according to the claim 1, wherein said counter electrode is divided into plural portions, each of thus divided portions of the counter electrode being arranged in facing relationship to plural picture element electrodes.

3. A photoelectric information input apparatus according to the claim 1, wherein every other ones of n picture element electrodes are electrically connected in common.

4. A photoelectric information input apparatus comprising:
    a photoelectric converting unit having
        a photoelectric converting layer provided between a linear array of a number n of picture element electrodes and a counter electrode and having a charge generating portion provided on an electrode transparent to the incident light and a charge transporting portion for effectively transporting the charge generated in said charge generating portion, said photoelectric converting layer having a wedge shaped configuration and the varying wedge thickness, and at least one insulating layer provided between said photoelectric converting layer and said counter electrode or between said photoelectric converting layer and said linear array of picture element electrodes;
    pulse generating means for generating time-sequential pulses of a number corresponding to that of said picture element electrode;
    a counter for releasing time-sequential output signals from n output terminal thereof in response to the signals received from said pulse generating means;
    resistors in a number n respectively connected to said output terminals and having resistances respectively corresponding to the threshold voltages between said counter electrode and respective picture element electrodes; and
    an operational amplifier connected in series to said resistors for transmitting said output signals to said picture element electrodes.

* * * * *

UNITED STATES PATENT AND TRADEMARK OFFICE
CERTIFICATE OF CORRECTION

PATENT NO. : 4,279,000
DATED : July 14, 1981
INVENTOR(S) : Tadaji Fukuda, et al

It is certified that error appears in the above—identified patent and that said Letters Patent is hereby corrected as shown below:

Column 4, line 29, "A" should read -- $\overset{\circ}{A}$ --

Signed and Sealed this

Fourteenth Day of September 1982

[SEAL]

Attest:

GERALD J. MOSSINGHOFF

*Attesting Officer*     *Commissioner of Patents and Trademarks*